(12) United States Patent
Yoshida (10) Patent No.: US 12,118,699 B2
(45) Date of Patent: Oct. 15, 2024

(54) LUMINANCE CORRECTION APPARATUS

(71) Applicant: SHARP KABUSHIKI KAISHA, Sakai (JP)

(72) Inventor: Yuichi Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 427 days.

(21) Appl. No.: 17/544,774

(22) Filed: Dec. 7, 2021

(65) Prior Publication Data

US 2022/0188994 A1 Jun. 16, 2022

(30) Foreign Application Priority Data

Dec. 11, 2020 (JP) ................................. 2020-205513

(51) Int. Cl.
*G06T 5/92* (2024.01)
*G06V 10/60* (2022.01)

(52) U.S. Cl.
CPC ................ *G06T 5/92* (2024.01); *G06V 10/60* (2022.01); *G06T 2207/20208* (2013.01)

(58) Field of Classification Search
None
See application file for complete search history.

(56) References Cited

U.S. PATENT DOCUMENTS

| 2001/0055428 A1* | 12/2001 | Hayashi | G06T 5/20 |
| | | | 382/274 |
| 2011/0176024 A1* | 7/2011 | Kwon | H04N 23/70 |
| | | | 348/222.1 |
| 2020/0007695 A1* | 1/2020 | Kagawa | H04N 1/6058 |

FOREIGN PATENT DOCUMENTS

| CN | 102143325 A | * | 8/2011 | |
| CN | 106821694 A | * | 6/2017 | ............. A61H 3/061 |
| JP | 2007079587 A | * | 3/2007 | |
| JP | 2009-267902 A | | 11/2009 | |
| JP | 2018117288 A | * | 7/2018 | ......... G06K 9/00255 |
| JP | 2019047246 A | * | 3/2019 | |
| WO | WO-2012060318 A1 | * | 5/2012 | ............... A61B 8/06 |

OTHER PUBLICATIONS

"Histogram equalization" (The Wayback Machine of the Wikipedia page "Histogram equalization"—2018—pp. 1-8) (Year: 2018).*

* cited by examiner

*Primary Examiner* — Bernard Krasnic
(74) *Attorney, Agent, or Firm* — ScienBiziP, P.C.

(57) ABSTRACT

An image processing apparatus includes an image processing unit configured to generate a second image obtained by performing predetermined image processing on a first image representing an input image, a determination unit configured to determine a luminance correction range on the basis of image information in one of a high luminance range and a low luminance range determined in accordance with the image processing, and a luminance correction unit configured to correct a luminance value in the luminance correction range determined by the determination unit for the second image.

7 Claims, 5 Drawing Sheets

LUMINANCE CORRECTION APPARATUS

BACKGROUND

1. Field

The present disclosure relates to an image processing apparatus and an image processing method.

2. Description of the Related Art

Image processing apparatuses have been developed that perform luminance correction, such as dynamic range expansion, on video signals. As an example, Japanese Unexamined Patent Application Publication No. 2009-267902 describes an image processing apparatus that removes, from a video signal subjected to sharpness processing that adds overshoot and undershoot, the added overshoot and undershoot and, thereafter, performs dynamic range expansion.

In the technology described in Japanese Unexamined Patent Application Publication No. 2009-267902, dynamic range expansion is uniformly performed after removing overshoot and undershoot from a video signal. As a result, the luminance of a shoot area subjected to overshoot or undershoot may fall outside the luminance range that can be displayed by a display device and, thus, luminance crushing may occur in the shoot area of the image.

To address such an issue, a configuration in which dynamic range expansion can be performed without removing overshoot and undershoot from the video signal. However, in the configuration, it is difficult to perform sufficient dynamic expansion.

Accordingly, one aspect of the present disclosure provides a technology that can perform more suitable luminance correction in accordance with an input image.

SUMMARY

According to an aspect of the present disclosure, an image processing apparatus includes an image processing unit configured to generate a second image obtained by performing predetermined image processing on a first image representing an input image, a determination unit configured to determine a luminance correction range on a basis of image information in one of a high luminance range and a low luminance range determined in accordance with the image processing, and a luminance correction unit configured to correct a luminance value in the luminance correction range determined by the determination unit for the second image.

According to another aspect of the present disclosure, an image processing method includes generating a second image obtained by performing predetermined image processing on a first image representing an input image, determining a luminance correction range on a basis of image information in one of a high luminance range and a low luminance range determined in accordance with the image processing, and correcting a luminance value in the determined luminance correction range for the second image.

DESCRIPTION OF THE EMBODIMENTS

First Embodiment

An embodiment of the present disclosure is described in detail below with reference to FIGS. 1 to 9. An image processing apparatus according to the present embodiment is an image processing apparatus that performs luminance correction on input image signals. According to the present embodiment, an example of the luminance correction performed by the image processing apparatus is dynamic expansion.

Figure 9:
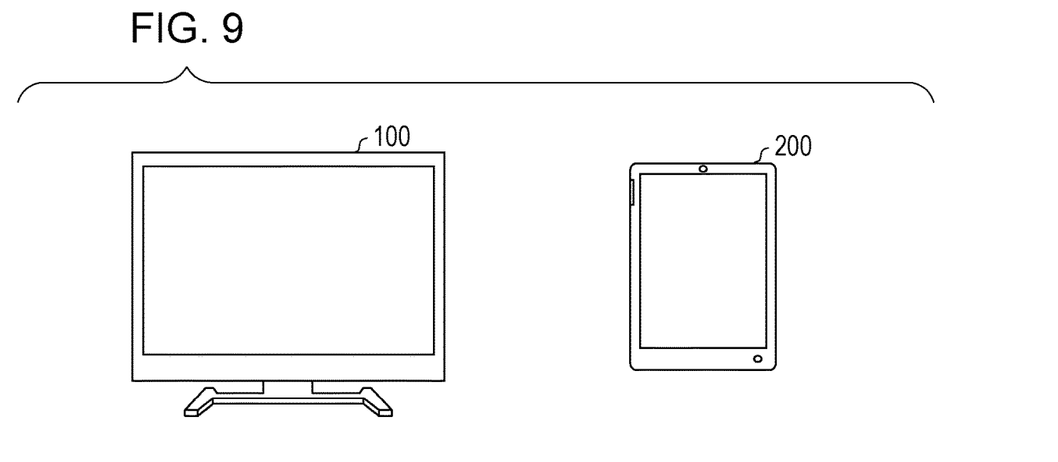
FIG. 9 is an external view of a television receiver and a tablet each including the image processing apparatus illustrated in FIG. 1.

The image processing apparatus according to the present embodiment may have a configuration achieved as a stand-alone image processing apparatus or a configuration implemented in a display device together with a display panel or the like. FIG. 9 is an external view of a television receiver 100 including the image processing apparatus according to the present embodiment and a tablet 200 including the image processing apparatus according to the present embodiment.

First Configuration Example of Image Processing Apparatus

Figure 1:
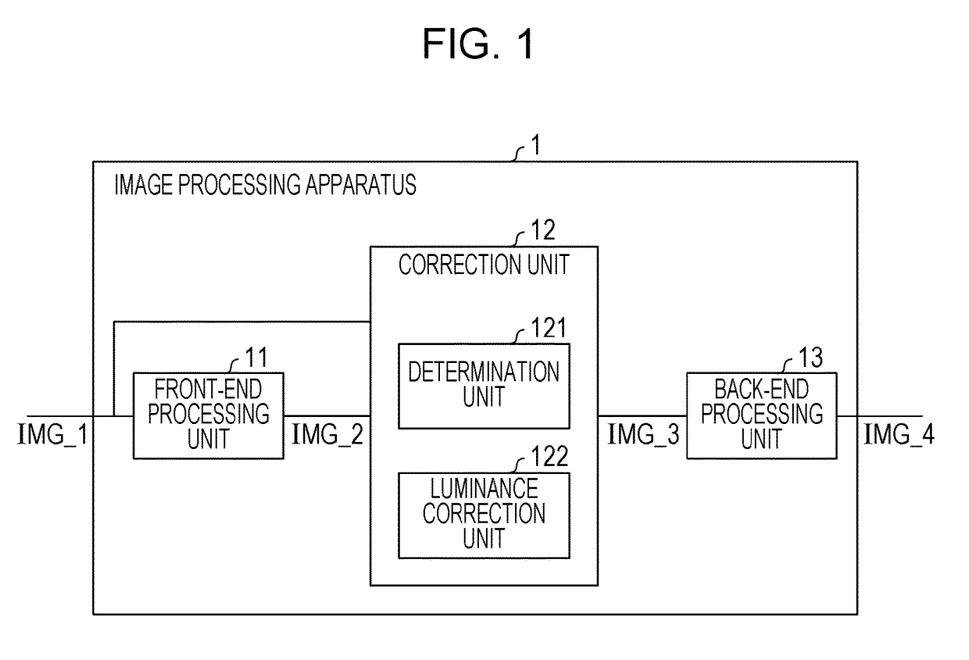
FIG. 1 is a block diagram illustrating a first example of the configuration of the major part of an image processing apparatus according to a first embodiment of the present disclosure.

FIG. 1 is a block diagram of the first example of the configuration of the major part of an image processing apparatus 1. As illustrated in FIG. 1, the image processing apparatus 1 includes a front-end processing unit 11, a correction unit 12, and a back-end processing unit 13. The correction unit 12 includes a determination unit 121 and a luminance correction unit 122. According to the present embodiment, the front-end processing unit 11 corresponds to an image processing unit defined in the claims. According to the present embodiment, an "image" may be a still image, a moving image, or a combination thereof.

The front-end processing unit 11 generates a second image signal IMG_2 by performing predetermined image processing on a first image signal IMG_1, which represents an image input to the image processing apparatus 1. As illustrated in FIG. 1, the first image signal IMG_1 is further input to the correction unit 12. Note that the term "predetermined image processing" as used herein refers to, for example, scaling processing, sharpness processing, or the like. However, the predetermined image processing is not limited thereto.

As a result of the image processing performed by the front-end processing unit 11, the high luminance range and the low luminance range of the second image signal IMG_2 are determined. When the image processing performed by the front-end processing unit 11 includes the process of adding overshoot and undershoot, the term "high luminance range" mentioned above refers to the luminance range corresponding to the overshoot mentioned above, and the term "low luminance range" mentioned above refers to the luminance range corresponding to the undershoot mentioned above.

Second Configuration Example of Image Processing Apparatus

Figure 2:
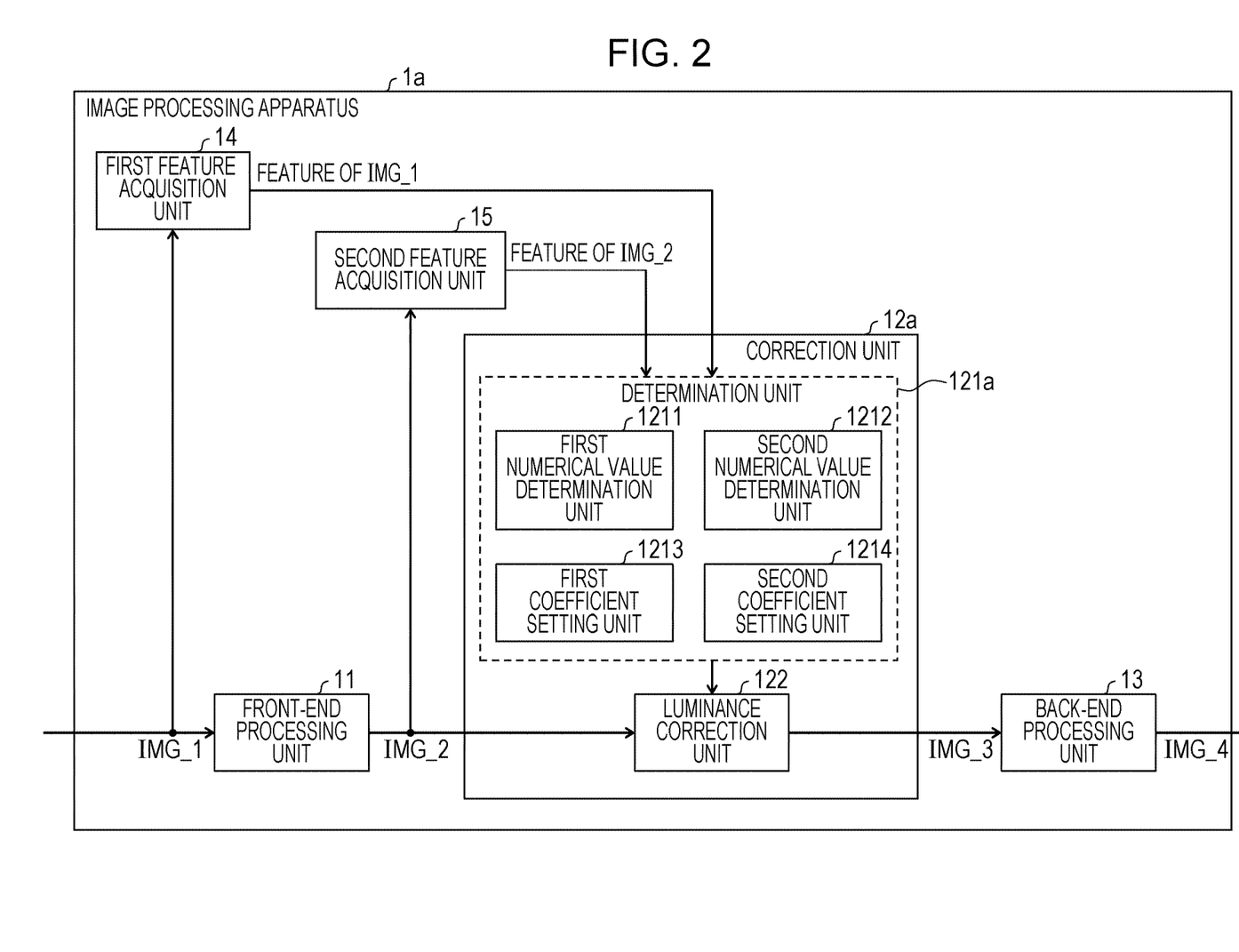
FIG. 2 is a block diagram illustrating a second example of the configuration of the major part of the image processing apparatus illustrated in FIG. 1.

FIG. 2 is a block diagram of a second example of the configuration of the major part of the image processing apparatus 1 according to the present embodiment. For convenience of description, the same reference numerals are used in FIG. 2 to describe those members having identical functions to the members in FIG. 1, and description of the members is not repeated.

As illustrated in FIG. 2, an image processing apparatus 1a includes a first feature acquisition unit 14, a front-end processing unit 11, a second feature acquisition unit 15, a correction unit 12a, and a back-end processing unit 13. The correction unit 12a includes a determination unit 121a and a luminance correction unit 122.

The first feature acquisition unit 14 acquires the feature of the first image signal IMG_1, which represents an image input to the image processing apparatus 1a, and outputs the feature to the correction unit 12a. The second feature acquisition unit 15 acquires the feature of the second image signal IMG_2 generated by the front-end processing unit 11 and outputs the feature to the correction unit 12a. The term "feature" as used herein refers to, for example, the luminance of each of the image signals.

The determination unit 121a includes a first numerical value determination unit 1211, a second numerical value determination unit 1212, a first coefficient setting unit 1213, and a second coefficient setting unit 1214. The functions of the first numerical value determination unit 1211, the second numerical value determination unit 1212, the first coefficient setting unit 1213, and the second coefficient setting unit 1214 are described below.

Figure 3:
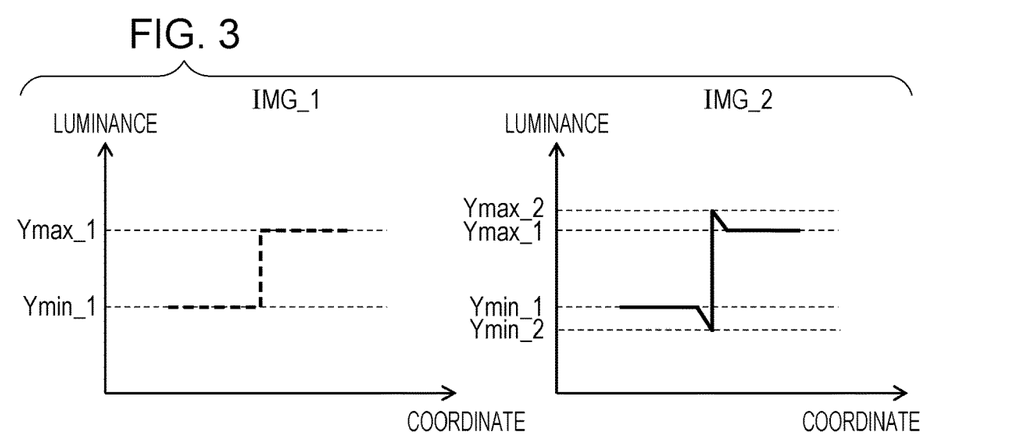
FIG. 3 illustrates an example of the image processing performed by a front-end processing unit illustrated in FIG. 1.

FIG. 3 is a diagram to describe an example of the image processing performed by the front-end processing unit 11. The left graph in FIG. 3 schematically illustrates the relationship between the luminance of the first image signal IMG_1, which is input to the front-end processing unit 11, and the coordinate of a pixel. In addition, the right graph in FIG. 3 schematically illustrates the relationship between the luminance of the second image signal IMG_2, which is the image signal subjected to the image processing performed by the front-end processing unit 11, and the coordinate of a pixel.

In the example illustrated in FIG. 3, the first image signal IMG_1 has a maximum luminance Ymax_1 and a minimum luminance Ymin_1. In addition, the second image signal IMG_2 has a maximum luminance Ymax_2 and a minimum luminance Ymin_2 due to the overshoot and undershoot added through the image processing performed by the front-end processing unit 11.

In the example illustrated in FIG. 3, through the image processing performed by the front-end processing unit 11, the luminance range of Ymax_1 to Ymax_2 is determined as the high luminance range, and the luminance range of Ymin_2 to Ymin_1 is determined as the low luminance range.

The determination unit 121 (the determination unit 121a in the second configuration example) determines the luminance correction range on the basis of the image information in the high or low luminance range determined in accordance with the image processing performed by the front-end processing unit 11. The luminance correction unit 122 corrects the luminance values in the luminance correction range determined by the determination unit for the second image signal IMG_2. Thereafter, a third image signal IMG_3 that represents an image having corrected luminance is input from the correction unit 12 (the correction unit 12a in the second configuration example) to the back-end processing unit 13 described above.

As used herein, the term "image information" mentioned above refers to, for example, information that includes at least one of the following items:

the number of pixels with luminance within the high luminance range or the low luminance range, and the size of the high luminance range or the low luminance range.

The details of the image information according to the present embodiment are described later.

The back-end processing unit 13 performs back-end processing, such as color adjustment, on the third image signal IMG_3 and outputs a fourth image signal IMG_4. The output fourth image signal IMG_4 is supplied to, for example, a display panel (not illustrated).

As described above, the image processing apparatus 1 (the image processing apparatus 1a in the second configuration example) according to the present embodiment includes the front-end processing unit 11 that generates the second image signal IMG_2, which represents an image obtained by performing predetermined image processing on the first image signal IMG_1 representing an input image, the determination unit 121 (the determination unit 121a in the second configuration example) that determines the luminance correction range on the basis of the image information in the high luminance range or low luminance range determined in accordance with the image processing performed by the front-end processing unit 11, and the luminance correction unit 122 that corrects the luminance value within the luminance correction range determined by the determination unit 121 (the determination unit 121a in the second configuration example) for the second image signal IMG_2. Thus, the image processing apparatus 1 (the image processing apparatus 1a in the second configuration example) according to the present embodiment can perform luminance correction in a suitable manner in accordance with the input image.

Example of Processing Performed by Front-End Processing Unit

The image processing performed by the front-end processing unit 11 according to the present embodiment is described in detail below with reference to different figures.

Figure 4:
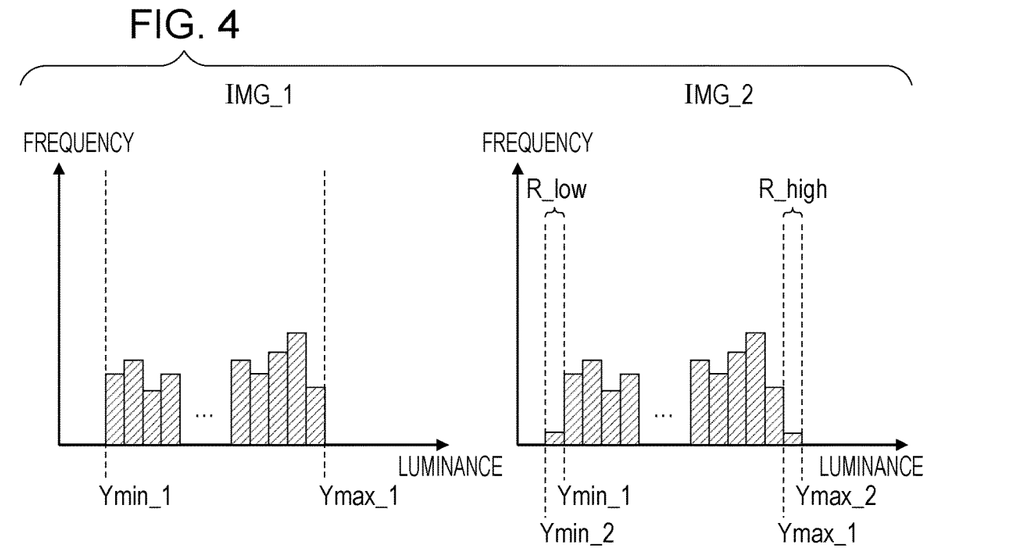
FIG. 4 illustrates the histogram of a first image signal input to the front-end processing unit illustrated in FIG. 1 and the histogram of a second image signal subjected to image processing performed by the front-end processing unit.

FIG. 4 illustrates the histogram of the first image signal IMG_1 input to the front-end processing unit 11 and the histogram of the second image signal IMG_2 subjected to the image processing performed by the front-end processing unit 11.

As illustrated on the left side of FIG. 4, the first image signal IMG_1 has the maximum luminance Ymax_1 and the minimum luminance Ymin_1. In contrast, as illustrated on the right side of FIG. 4, the second image signal IMG_2 has a maximum luminance Ymax_2 and a minimum luminance Ymin_2 due to the overshoot and undershoot added through the image processing performed by the front-end processing unit 11.

In the example illustrated in FIG. 3, the luminance range of Ymax_1 to Ymax_2 is determined as the high luminance range R_high, and the luminance range of Ymin_2 to Ymin_1 is determined as the low luminance range R_low through the image processing performed by the front-end processing unit 11.

First Example of Processing Performed by Determination Unit

Figure 5:
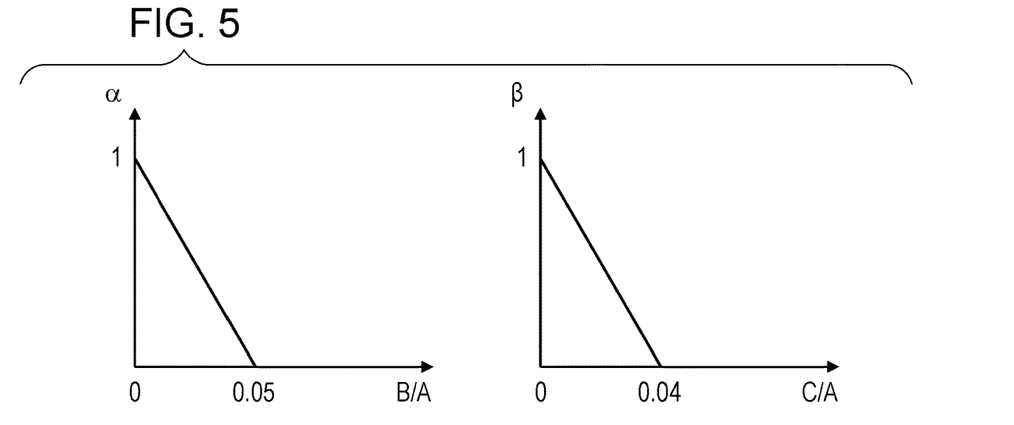
FIG. 5 illustrates an example of the calculation of first and second weight coefficients.

The first example of processing performed by the determination unit 121 (the determination unit 121a in the second configuration example) is described below with reference to FIG. 5. FIG. 5 illustrates an example of calculation of first and second weight coefficients α and β.

In this example, the determination unit 121 sets the first weight coefficient α and the second weight coefficient β in accordance with the number of pixels with luminance within the high luminance range R_high or the low luminance range R_low in the first image signal IMG_1 or the second image signal IMG_2.

In the second configuration example, the first coefficient setting unit 1213 sets the first weight coefficient α in accordance with the number of pixels with luminance within the high luminance range R_high in the first image signal IMG_1 or the second image signal IMG_2.

Note that the first coefficient setting unit 1213 may set the first weight coefficient α in accordance with the number of pixels with luminance within the low luminance range R_low in the first image signal IMG_1 or the second image signal IMG_2.

In addition, in the second configuration example, the second coefficient setting unit 1214 sets the second weight coefficient β in accordance with the number of pixels with luminance within the low luminance range R_low in the first image signal IMG_1 or the second image signal IMG_2.

Note that the second coefficient setting unit 1214 may set the second weight coefficient β in accordance with the number of pixels with luminance within the high luminance range R_high in the first image signal IMG_1 or the second image signal IMG_2.

More specifically, the determination unit 121 (the first coefficient setting unit 1213 in the second configuration example) sets the first weight coefficient α in accordance with the ratio of the frequency (the number of pixels) in the region in the histogram that exceeds the maximum luminance Ymax_1 of the first image signal IMG_1 (that is, the high luminance range R_high in the second image signal IMG_2) to the total frequency of the histogram. For example, if the ratio of the frequency in the region exceeding the maximum luminance Ymax_1 to the total frequency of the histogram is 0% (no overshoot occurs), the first weight coefficient α may be set to 1, and if the ratio is, for example, 5%, the first weight coefficient α may be set to 0.

The left graph in FIG. 5 illustrates an example of the first weight coefficient α set by the determination unit 121 (the first coefficient setting unit 1213 in the second configuration example). In the left graph in FIG. 5, "A" indicates the total frequency in the histogram of the second image signal IMG_2, and "B" indicates the frequency in the high luminance range R_high of the histogram of the second image signal IMG_2. Therefore, "B/A", which is the abscissa of the left graph in FIG. 5, represents the ratio of the frequency in the region that exceeds the maximum luminance Ymax_1 of the first image signal IMG_1 in the histogram to the total frequency in the histogram.

In addition, the determination unit 121 (the second coefficient setting unit 1214 in the second configuration example) sets the second weight coefficient β in accordance with the ratio of the frequency (the number of pixels) in the region of the histogram in which the luminance falls below the minimum luminance Ymin_1 of the first image signal IMG_1 (that is, the low luminance range R_low in the second image signal IMG_2) to the total frequency of the histogram. For example, if the ratio of the frequency in the region in which the luminance falls below the minimum luminance Ymin_1 to the total frequency of the histogram is 0% (no undershoot occurs), the second weight coefficient β may be set to 1, and if the ratio is, for example, 4%, the second weight coefficient β may be set to 0.

The right graph in FIG. 5 illustrates an example of the second weight coefficient β set by the determination unit 121 (the second coefficient setting unit 1214 in the second configuration example). In the right graph in FIG. 5, "A" indicates the total frequency of the histogram of the second image signal IMG_2, and "C" indicates the frequency within the low luminance range R_low in the histogram of the second image signal IMG_2. Therefore, "C/A", which is the abscissa of the right graph in FIG. 5, represents the ratio of the frequency in the region in which the luminance falls below the minimum luminance Ymin_1 of the first image signal IMG_1 in the histogram to the total frequency in the histogram.

Thereafter, the determination unit 121 (the first numerical value determination unit 1211 in the second configuration example) determines an upper limit MAX of the luminance correction range (refer to FIG. 6 described below) by a weighted average of the upper limit Ymax_1 of luminance in the first image signal IMG_1 and the upper limit Ymax_2 of luminance in the second image signal IMG_2, using the first weight coefficient α.

Figure 6:
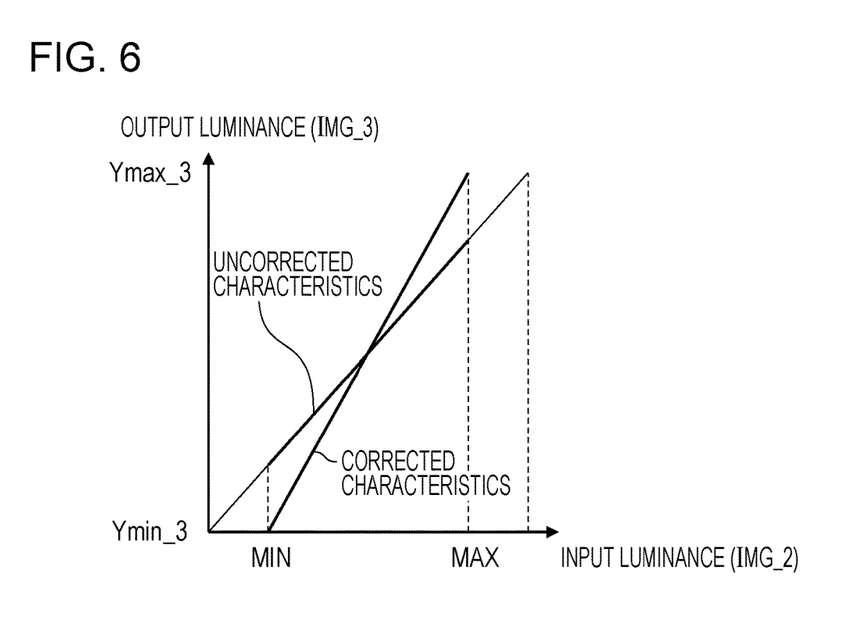
FIG. 6 illustrates an example of processing performed by a correction unit illustrated in FIG. 1.

More specifically, to determine the upper limit MAX of the luminance correction range, the following equation is used:

$$MAX = Ymax\_1 \times \alpha + Ymax\_2 \times (1-\alpha) \qquad (1).$$

In addition, the determination unit 121 (the second numerical value determination unit 1212 in the second configuration example) determines a lower limit MIN of the luminance correction range (refer to FIG. 6 described below) by a weighted average of the lower limit Ymin_1 of luminance in the first image signal IMG_1 and the lower limit Ymin_2 of luminance in the second image signal IMG_2, using the second weight coefficient β.

More specifically, to determine the lower limit MIN of the luminance correction range, the following equation is used:

$$MIN = Ymin\_1 \times \beta + Ymin\_2 \times (1-\beta) \qquad (2).$$

Second Example of Processing Performed by Determination Unit

A second example of the processing performed by the determination unit 121 is described below. In the above description of the first example of the processing, the determination unit 121 sets the first and second weight coefficients in accordance with the number of pixels with luminance within the high luminance range R_high or the low luminance range R_low in the first image signal IMG_1 or the second image signal IMG_2 and determines the upper and lower limits of the luminance correction range. In this example, however, the first and second weight coefficients may be set in accordance with the size of the high luminance range R_high or the low luminance range R_low in the first image signal IMG_1 or the second image signal IMG_2, and the upper and lower limits of the luminance correction range may be determined.

More specifically, the determination unit 121 may have a configuration to set the first weight coefficient α and the second weight coefficient β in accordance with the size of the high luminance range R_high in the histogram or the size of the low luminance range R_low in the histogram of the first image signal IMG_1 or the second image signal IMG_2.

In the second configuration example, the first coefficient setting unit 1213 has a configuration to set the first weight coefficient α in accordance with the size of the high luminance range R_high in the histogram of the first image signal IMG_1 or the second image signal IMG_2.

Note that the first coefficient setting unit 1213 may have a configuration to set the first weight coefficient α in accordance with the size of the low luminance range R_low in the histogram of the first image signal IMG_1 or the second image signal IMG_2.

In addition, in the second configuration example, the second coefficient setting unit 1214 has a configuration to set the second weight coefficient β in accordance with the size of the low luminance range R_low in the histogram of the first image signal IMG_1 or the second image signal IMG_2.

Note that the second coefficient setting unit 1214 may have a configuration to set the second weight coefficient β in accordance with the size of the high luminance range R_high in the histogram of the first image signal IMG_1 or the second image signal IMG_2.

As an example, the determination unit 121 (the first coefficient setting unit 1213 in the second configuration example) may set the first weight coefficient α in accordance with Ymax_2−Ymax_1, which is the size of the high luminance range R_high, and the determination unit 121 (the second coefficient setting unit 1214 in the second configuration example) may set the second weight coefficient β in accordance with Ymin_1−Ymin_2, which is the size of the low luminance range R_low.

Thereafter, the determination unit 121 may determine the upper limit MAX of the luminance correction range by a weighted average of the upper limit of the luminance of the first image signal IMG_1 and the upper limit of the luminance of the second image signal IMG_2, using the first weight coefficient, and may determine the lower limit MIN of the luminance correction range by a weighted average of the lower limit of the luminance of the first image signal IMG_1 and the lower limit of the luminance of the second image signal IMG_2, using the second weight coefficient.

In the second configuration example, the first numerical value determination unit 1211 may have a configuration to determine the upper limit MAX of the luminance correction range by a weighted average of the upper limit of the luminance in the first image signal IMG_1 and the upper limit of the luminance in the second image signal IMG_2, using the first weight coefficient. In addition, in the second configuration example, the second numerical value determination unit 1212 may have a configuration to determine the lower limit MIN of the luminance correction range by a weighted average of the lower limit of the luminance in the first image signal IMG_1 and the lower limit of the luminance in the second image signal IMG_2, using the second weight coefficient.

More specifically, a configuration may be employed that calculates the upper limit MAX and the lower limit MIN of the luminance correction range by using the above-described Equations 1 and 2 and the first weight coefficient α and the second weight coefficient β calculated as described above.

Third Example of Processing Performed by Determination Unit

In the first and second examples of the processing described above, if at least one of the above-described number of pixels and the size included in the image information is greater than a predetermined value, the determination unit 121 (the determination unit 121a in the second configuration example) may determine the luminance correction range in accordance with the image information.

For example, the determination unit 121 may have a configuration to determine the upper limit MAX of the luminance correction range regardless of B/A if B/A is greater than or equal to 0% and less than or equal to 1%, as described in the first example of processing, and to determine the upper limit MAX of the luminance correction range in accordance with B/A if B/A is greater than 1%.

In the second configuration example, the first numerical value determination unit 1211 may have a configuration to determine the upper limit MAX of the luminance correction range regardless of B/A if B/A is greater than or equal to 0% and less than or equal to 1%, as described in the first example of the processing, and to determine the upper limit MAX of the luminance correction range in accordance with B/A if B/A is greater than 1%.

Similarly, the determination unit 121, 121a may have a configuration to determine the lower limit MIN of the luminance correction range regardless of C/A if C/A is greater than or equal to 0% and less than or equal to 1%, as described in the first example of the processing, and to determine the lower limit MIN of the luminance correction range in accordance with C/A if C/A is greater than 1%.

In the second configuration example, the second numerical value determination unit 1212 may have a configuration to determine the lower limit MIN of the luminance correction range regardless of C/A if C/A is greater than or equal to 0% and less than or equal to 1%, as described in the first example of the processing, and to determine the lower limit MIN of the luminance correction range in accordance with C/A if C/A is greater than 1%.

Example of Processing Performed by Luminance Correction Unit

The example of the processing performed by the luminance correction unit 122 is described below with reference to FIG. 6.

As described above, the luminance correction unit 122 corrects the luminance value in the luminance correction range determined by the determination unit 121 for the second image signal IMG_2. As illustrated in FIG. 6, as an example, the luminance correction unit 122 generates the third image signal IMG_3 by expanding the luminance correction range defined by the upper limit MAX and the lower limit MIN to the maximum luminance range of the display panel for the second image signal IMG_2. Note that, as illustrated in FIG. 6, the upper limit of the luminance of the third image signal IMG_3 is denoted as Ymax_3, and the lower limit of the luminance of the third image signal IMG_3 is denoted as Ymin_3. As an example, the luminance correction unit 122 expands the luminance correction range for the second image signal IMG_2 so that the value of Ymax_3 is the maximum luminance that the display panel can produce and the value of Ymin_3 is the minimum luminance (i.e., 0) that the display panel can produce.

In this manner, as illustrated in FIG. 6, the uncorrected luminance characteristics (uncorrected characteristics) of the second image signal IMG_2 are converted into the corrected luminance characteristics (corrected characteristics) of the third image signal IMG_3.

Effect Provided by Image Processing Apparatus

Figure 7:
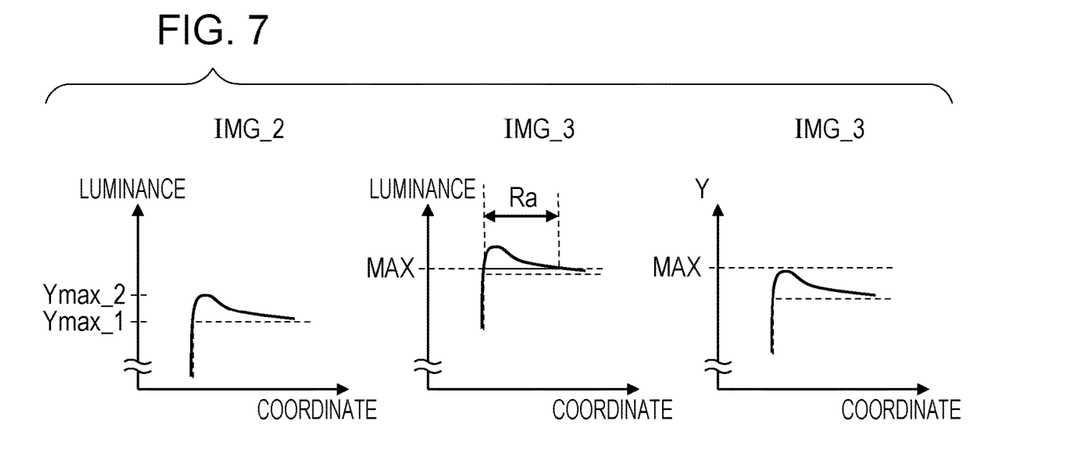
FIG. 7 is a diagram to describe the effects of the image processing apparatus illustrated in FIG. 1.

The effect provided by the image processing apparatus 1 (the image processing apparatus 1a in the second configuration example) is described in detail below with reference to FIG. 7. The reference symbols Ymax_1, Ymax_2, MAX, and MIN in FIG. 7 are the same as described above. The left graph in FIG. 7 schematically illustrates an example of the second image signal IMG_2 having overshoot added thereto through the image processing performed by the front-end processing unit 11.

If the upper limit MAX of the luminance correction range is set for the second image signal IMG_2 such that Ymax_1 is the same or substantially the same as MAX, the luminance of the pixels included in the range of an image region Ra illustrated in the middle graph in FIG. 7 is crushed.

In contrast, if the upper limit MAX of the luminance correction range is set for the second image signal IMG_2 such that Ymax_2 is the same or substantially the same as MAX, no luminance crushing occurs, as illustrated in the right graph in FIG. 7. However, the problem arises that a sufficient expansion size of luminance correction is not obtained.

The image processing apparatus 1 (the image processing apparatus 1a in the second configuration example) according to the present embodiment includes the front-end processing unit 11 that generates a second image signal IMG_2, which is an image obtained by performing a predetermined image processing on a first image signal IMG_1 representing an input image, the determination unit 121 that determines a luminance correction range on the basis of the image information in a high luminance range or a low luminance range determined in accordance with the image processing performed by the front-end processing unit 11, and the luminance correction unit 122 that corrects the luminance values in the luminance correction range determined by the determination unit 121 for the second image signal IMG_2. For this reason, according to the image processing apparatus 1 of the present embodiment, the luminance correction can be performed suitably in accordance with the input image.

Flow of Image Processing Performed by Image Processing Apparatus

Figure 8:
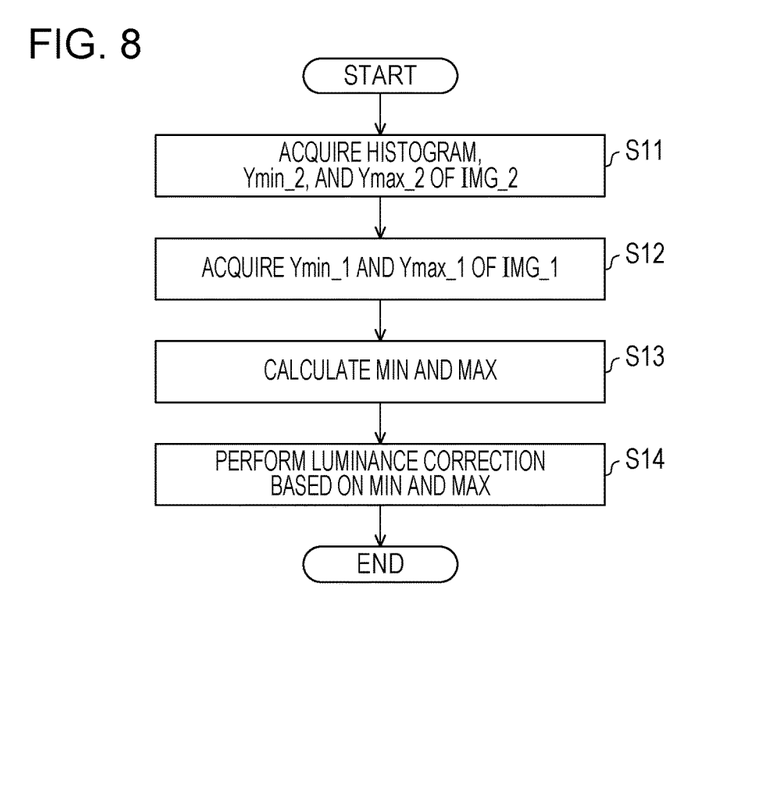
FIG. 8 is a Flowchart of an image processing method for use of the image processing apparatus illustrated in FIG. 1.

The flow of image processing performed by the image processing apparatus 1 (the image processing apparatus 1a in the second configuration example) is described below with reference to FIG. 8. FIG. 8 is a flowchart of the image processing method for use of the image processing apparatus illustrated in FIG. 1 or 2.

Step S11

In step S11, the correction unit 12 acquires the histogram, the minimum luminance Ymin_2, and the maximum luminance Ymax_2 of the second image signal IMG_2.

In the second configuration example, the second feature acquisition unit 15 acquires the histogram, the minimum luminance Ymin_2, and the maximum luminance Ymax_2 of the second image signal IMG_2 and provides the acquired information to the correction unit 12.

Step S12

Subsequently, in step S12, the correction unit 12 acquires the minimum luminance Ymin_1 and the maximum luminance Ymax_1 of the first image signal IMG_1.

In the second configuration example, the first feature acquisition unit 14 acquires the minimum luminance Ymin_1 and the maximum luminance Ymax_1 of the first image signal IMG_1 and provides the acquired information to the correction unit 12.

Step S13

Subsequently, in step S13, the determination unit 121 (the determination unit 121a in the second configuration example) of the correction unit 12 determines the upper limit MAX and the lower limit MIN of the luminance correction range. Note that a specific example of the process to determine the upper limit MAX and the lower limit MIN of the luminance correction range is the same as described above.

Step S14

Subsequently, in step S14, the luminance correction unit 122 of the correction unit 12 performs luminance correction on the basis of the upper limit MAX and the lower limit MIN of the luminance correction range determined by the determination unit 121 (the determination unit 121a in the second configuration example). A specific example of the luminance correction process is the same as described above.

Second Embodiment

Another embodiment of the present disclosure is described below. Note that for convenience of description, the same reference numerals are used in the present embodiment to describe those members having identical functions to the members of the above-described embodiment, and description of the members is not repeated.

For the image processing apparatus 1 (the image processing apparatus 1a in the second configuration example) according to the first embodiment, the configuration is described in which the determination unit 121 (the determination unit 121a in the second configuration example) determines the luminance correction range on the basis of the image information in the high luminance range or low luminance range determined in accordance with the image processing performed by the front-end processing unit 11. However, the aspect described herein is not limited thereto.

As an example, according to the present embodiment, a configuration is described in which the determination unit 121 determines the luminance correction range in accordance with the genre of the content represented by the image signal IMG_1.

The configuration of the image processing apparatus according to the present embodiment includes a genre identifying unit in addition to the configuration of the image processing apparatus 1 described in the first embodiment. The genre identifying unit identifies the genre of the content on the basis of the genre information regarding the content represented by the image signal IMG_1. Thereafter, the genre identifying unit supplies the information indicating the identified genre to the determination unit 121.

Note that the genre identifying unit may have a configuration to identify the genre in accordance with the frame rate of the image signal IMG_1, instead of the genre information. As an example, if the frame rate of the image signal IMG_1 is 24 Hz, the genre identifying unit may identify the genre of the content as a movie.

The determination unit 121 according to the present embodiment determines the luminance correction range (more specifically, MAX and MIN described in the first embodiment) in accordance with the information indicating the genre obtained from the genre identifying unit.

As an example, if the genre is a movie, the determination unit 121 may set the upper limit Ymax_2 of the second image signal IMG_2 as the upper limit MAX of the luminance correction range and set the lower limit Ymin_2 of the second image signal IMG_2 as the lower limit MIN of the luminance correction range.

In this manner, the image processing apparatus according to the present embodiment can perform luminance correction without losing the detailing from the content (such as a movie) that places a premium on the detailing.

The image processing apparatus according to the present embodiment may have a configuration including a mode identifying unit instead of or in addition to the genre identifying unit. As an example, the mode identifying unit can identify a mode in accordance with an input received from a user or an administrator. As another example, the mode identifying unit displays options for a plurality of modes on a display panel, receives input from the user in response to the displayed options, and identifies a mode in accordance with the received input. The mode identifying unit supplies the information indicating the identified mode to the determination unit 121.

The determination unit 121 according to the present embodiment identifies the luminance correction range (more specifically, MAX and MIN described in the first embodiment) in accordance with the information indicating the mode obtained from the mode identifying unit.

As an example, when the mode is an "in-store demonstration" mode, the determination unit 121 may set the upper limit Ymax_1 of the first image signal IMG_1 as the upper limit MAX of the luminance correction range and set the lower limit Ymin_1 of the first image signal IMG_1 as the lower limit MIN of the luminance correction range.

In this manner, the image processing apparatus according to the present embodiment can display a crisp image to its viewers in the "in-store demonstration" situation where it is desired for the image to have an impact on the viewers.

Note on First and Second Embodiments

While the first and second embodiments have been described using the terms "maximum", "minimum", "upper limit", and "lower limit", these terms are not intended to excessively restrict the above-described embodiments. For example, under the condition that the minimum value in the strict sense is 0 and the maximum value in the strict sense is 100, even if in the configuration according to the present embodiment, the minimum value and the maximum value are set to values sufficiently close to the values in the strict sense (e.g., the minimum value is set to 2, and the maximum value is set to 98), the present disclosure described herein can have a sufficient effect. The same applies to the terms "upper limit" and "lower limit.

Accordingly, the terms "maximum", "minimum", "upper limit", and "lower limit" as used herein are not to be interpreted in a limited sense in terms of design or mathematics, but have concepts that encompass deviations of a few percent from the strict values.

Example of Implementation Using Software

The control blocks of the image processing apparatus 1 (in particular, the front-end processing unit 11, the correction unit 12, and the back-end processing unit 13) may be implemented by logic circuits (i.e., hardware) formed in an integrated circuit (an IC chip) or may be implemented by software.

In the latter case, the image processing apparatus 1 includes a computer that executes the instructions of a program, which is software that provides each of the functions. The computer includes, for example, at least one processor (a control unit) and at least one computer-readable recording medium that stores the program mentioned above. The purpose of the present disclosure is achieved when the processor of the computer reads the program from the recording medium and executes the program. As the processor, a central processing unit (CPU), for example, can be used. As the recording medium, a "non-transitory tangible medium", such as a read only memory (ROM), a tape, a disk, a card, a semiconductor memory, or a programmable logic circuit, can be used. Furthermore, the computer may include a random access memory (RAM) into which the program is loaded. The above-described program may be supplied to the computer via any type of transmission medium (such as a communication network and a broadcast wave) capable of transmitting the program. Note that an aspect of the present disclosure can be embodied in the form of a data signal embedded in a carrier wave in which the program is embodied by electronic transmission.

SUMMARY

According to a first aspect of the present disclosure, the image processing apparatus (1) includes an image processing unit (11) configured to generate a second image obtained by performing predetermined image processing on a first image representing an input image, a determination unit (121) configured to determine a luminance correction range on the basis of image information in one of a high luminance range and a low luminance range determined in accordance with the image processing, and a luminance correction unit (122) configured to correct a luminance value in the luminance correction range determined by the determination unit (121) for the second image.

According to the above-described configuration, it is possible to perform more suitable luminance correction in accordance with the input image.

According to the image processing apparatus (1) of a second aspect of the present disclosure, in the first aspect, the determination unit (121) may determine the luminance correction range on the basis of the image information including at least one of the number of pixels having a luminance within one of the high luminance range and the low luminance range and the size of one of the high luminance range and the low luminance range in one of the first image and the second image.

According to the image processing apparatus (1) of a third aspect of the present disclosure, in the second aspect, the determination unit (121) may set first and second weight coefficients in accordance with the number of pixels having a luminance within one of the high luminance range and the low luminance range in one of the first image and the second image. In addition, the determination unit (121) may determine an upper limit of the luminance correction range by a weighted average of an upper limit of luminance in the first image and an upper limit of luminance in the second image, using the first weight coefficient, and may determine a lower limit of the luminance correction range by a weighted average of a lower limit of luminance in the first image and a lower limit of luminance in the second image, using the second weight coefficient.

According to the image processing apparatus (1) of a fourth aspect of the present disclosure, in the second aspect, the determination unit (121) may set first and second weight coefficients in accordance with the size of one of the high luminance range and the low luminance range in one of the first image and the second image. In addition, the determination unit (121) may determine an upper limit of the luminance correction range by a weighted average of an upper limit of luminance in the first image and an upper limit of luminance in the second image, using the first weight coefficient, and may determine a lower limit of the luminance correction range by a weighted average of a lower limit of luminance in the first image and a lower limit of luminance in the second image, using the second weight coefficient.

According to the image processing apparatus (1) of a fifth aspect of the present disclosure, in any one of the second to fourth aspects, the determination unit (121) may determine the luminance correction range in accordance with the image information if at least one of the number of pixels and the size included in the image information is greater than a predetermined value.

An image processing method according to a sixth aspect of the present disclosure includes generating a second image obtained by performing predetermined image processing on a first image representing an input image, determining a luminance correction range on the basis of image information in one of a high luminance range and a low luminance range determined in accordance with the image processing, and correcting a luminance value in the determined luminance correction range for the second image.

According to the above-described configuration, effects the same as those of the first aspect are provided.

The present disclosure is not limited to each of the above-described embodiments. Various changes and variations can be made within the scope of the claims. An embodiment obtained by appropriately combining technical elements disclosed in different embodiments is also encompassed within the technical scope of the present disclosure. Furthermore, a new technical feature can be formed by combining technical elements disclosed in the embodiments.

The present disclosure contains subject matter related to that disclosed in Japanese Priority Patent Application JP 2020-205513 filed in the Japan Patent Office on Dec. 11, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A luminance correction apparatus comprising:
   at least one processor; and
   at least one non-transitory computer-readable medium coupled to the at least one processor and storing one or more computer executable instructions that, when executed by the at least one processor, cause the luminance correction apparatus to:
   generate a second image obtained by performing predetermined image processing on a first image representing an input image;
   determine a luminance correction range based on image information in one of a high luminance range or a low luminance range determined according to the predetermined image processing;
   correct a luminance value in the determined luminance correction range for the second image;
   set a first weight coefficient and a second weight coefficient based on a number of pixels having a luminance within one of the high luminance range or the low luminance range in one of the first image or the second image;
   determine an upper limit of the luminance correction range by a weighted average of an upper limit of a luminance in the first image and an upper limit of a luminance in the second image, using the first weight coefficient; and
   determine a lower limit of the luminance correction range by a weighted average of a lower limit of a luminance in the first image and a lower limit of a luminance in the second image, using the second weight coefficient.

2. A luminance correction apparatus comprising:
   at least one processor; and
   at least one non-transitory computer-readable medium coupled to the at least one processor and storing one or more computer executable instructions that, when executed by the at least one processor, cause the luminance correction apparatus to:
   generate a second image obtained by performing predetermined image processing on a first image representing an input image;
   determine a luminance correction range based on image information in one of a high luminance range or a low luminance range determined according to the predetermined image processing;
   correct a luminance value in the determined luminance correction range for the second image;
   set a first weight coefficient and a second weight coefficient based on a size of one of the high luminance range or the low luminance range in one of the first image or the second image;
   determine an upper limit of the luminance correction range by a weighted average of an upper limit of a luminance in the first image and an upper limit of a luminance in the second image, using the first weight coefficient; and
   determine a lower limit of the luminance correction range by a weighted average of a lower limit of a luminance in the first image and a lower limit of a luminance in the second image, using the second weight coefficient.

3. The luminance correction apparatus according to claim 2, wherein the one or more computer-executable instructions, when executed by the at least one processor, further cause the luminance correction apparatus to determine the luminance correction range according to the image information if the size included in the image information is greater than a predetermined value.

4. A method for luminance correction, the method comprising:
   generating a second image obtained by performing predetermined image processing on a first image representing an input image;
   determining a luminance correction range based on image information in one of a high luminance range or a low luminance range determined according to the predetermined image processing;
   correcting a luminance value in the determined luminance correction range for the second image;
   setting a first weight coefficient and a second weight coefficient based on a number of pixels having a luminance within one of the high luminance range or the low luminance range in one of the first image or the second image;
   determining an upper limit of the luminance correction range by a weighted average of an upper limit of a luminance in the first image and an upper limit of a luminance in the second image, using the first weight coefficient; and
   determining a lower limit of the luminance correction range by a weighted average of a lower limit of a luminance in the first image and a lower limit of a luminance in the second image, using the second weight coefficient.

5. A method for luminance correction, the method comprising:
- generating a second image obtained by performing predetermined image processing on a first image representing an input image;
- determining a luminance correction range based on image information in one of a high luminance range or a low luminance range determined according to the predetermined image processing;
- correcting a luminance value in the determined luminance correction range for the second image;
- setting a first weight coefficient and a second weight coefficient based on a size of one of the high luminance range or the low luminance range in one of the first image or the second image;
- determining an upper limit of the luminance correction range by a weighted average of an upper limit of a luminance in the first image and an upper limit of a luminance in the second image, using the first weight coefficient; and
- determining a lower limit of the luminance correction range by a weighted average of a lower limit of a luminance in the first image and a lower limit of a luminance in the second image, using the second weight coefficient.

6. A non-transitory computer-readable medium storing computer executable instructions that, when executed by at least one processor, cause the at least one processor to:
- generate a second image obtained by performing predetermined image processing on a first image representing an input image;
- determine a luminance correction range based on image information in one of a high luminance range or a low luminance range determined according to the predetermined image processing;
- correct a luminance value in the determined luminance correction range for the second image;
- set a first weight coefficient and a second weight coefficient based on a number of pixels having a luminance within one of the high luminance range or the low luminance range in one of the first image or the second image;
- determine an upper limit of the luminance correction range by a weighted average of an upper limit of a luminance in the first image and an upper limit of a luminance in the second image, using the first weight coefficient; and
- determine a lower limit of the luminance correction range by a weighted average of a lower limit of a luminance in the first image and a lower limit of a luminance in the second image, using the second weight coefficient.

7. A non-transitory computer-readable medium storing computer executable instructions that, when executed by at least one processor, cause the at least one processor to:
- generate a second image obtained by performing predetermined image processing on a first image representing an input image;
- determine a luminance correction range based on image information in one of a high luminance range or a low luminance range determined according to the predetermined image processing;
- correct a luminance value in the determined luminance correction range for the second image;
- set a first weight coefficient and a second weight coefficient based on a size of one of the high luminance range or the low luminance range in one of the first image or the second image;
- determine an upper limit of the luminance correction range by a weighted average of an upper limit of a luminance in the first image and an upper limit of a luminance in the second image, using the first weight coefficient; and
- determine a lower limit of the luminance correction range by a weighted average of a lower limit of a luminance in the first image and a lower limit of a luminance in the second image, using the second weight coefficient.

\* \* \* \* \*